United States Patent Office 2,711,637
Patented June 28, 1955

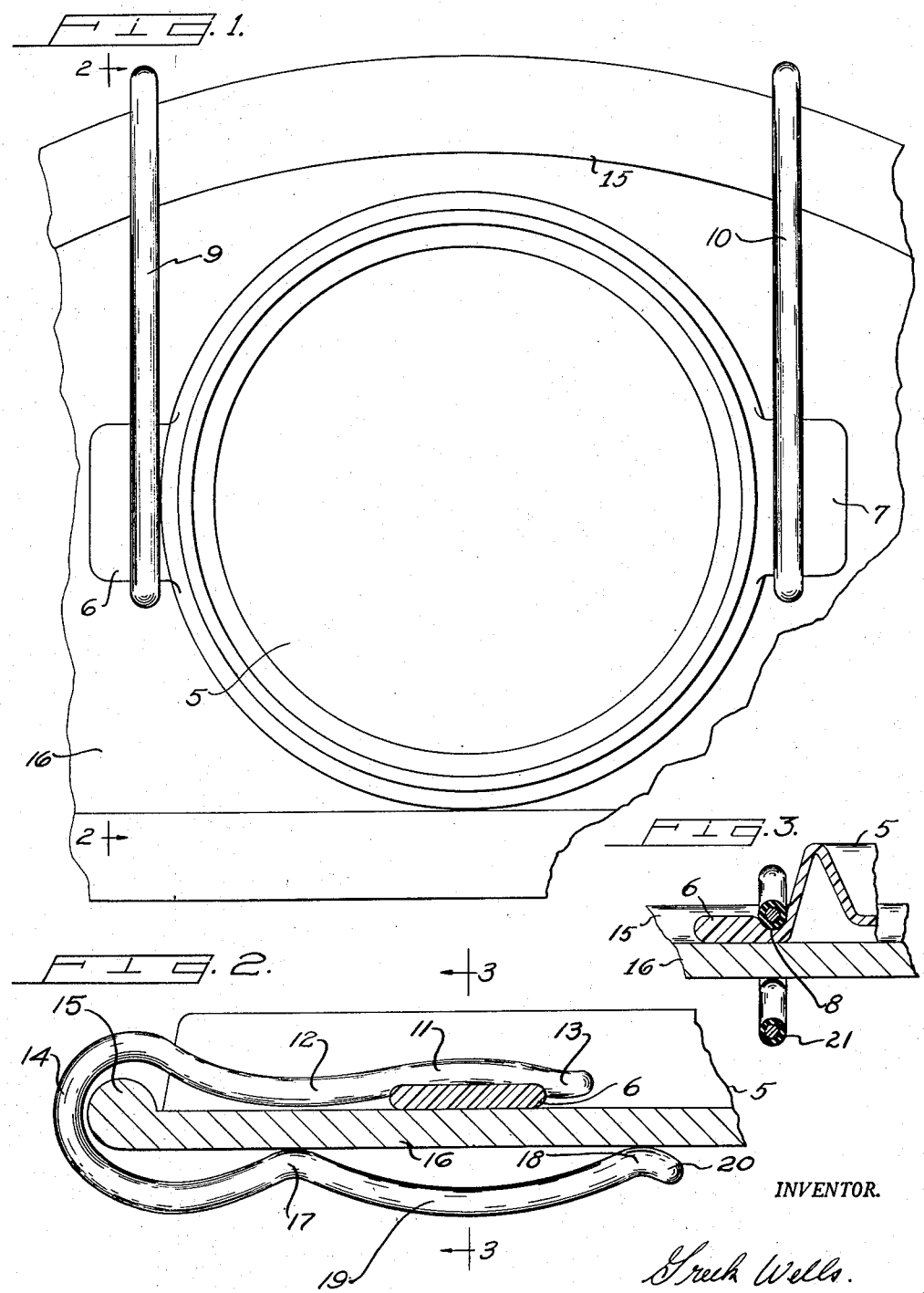

2,711,637

CHILD'S DISH AND HOLDING MEANS THEREFOR

Greek Wells, Spokane, Wash., assignor to The Kendall Corporation, Milwaukee, Wis., a corporation of Wisconsin Application August 16, 1950, Serial No. 179,693

1 Claim. (Cl. 65—54)

The present invention relates to improvements in a child's dish and holding means therefor.

It is the purpose of the present invention to provide a simple, inexpensive means whereby a child's dish may be secured in place upon a high chair tray or other surface so that the child cannot tip the dish over or lift it from the surface. One of the problems in this connection is to provide a suitable means, separate and apart from the dish, which can be readily cleaned and which will occupy very little storage space, the securing means being of such a nature that it can be applied to supports that vary considerably as to thickness and the like.

It is a further purpose of my invention to provide a child's dish and clamping means therefor which leave the entire food receiving portion of the dish free for use in the ordinary fashion and at the same time provide a means for securely clamping the dish to a surface.

Other and more detailed objects and advantages of the invention will appear from the following description and the accompanying drawings wherein a preferred embodiment of the invention is shown.

Figure 1 is a plan view illustrating my invention holding a dish on a support such as a high chair tray;

Figure 2 is a fragmentary section view taken on the line 2—2 of Figure 1; and

Figure 3 is a fragmentary sectional view taken on the line 3—3 of Figure 2.

Referring now in detail to the drawings, the numeral 5 indicates a food dish which may be formed of any suitable material such for example as one of the plastic compositions now commonly used for this purpose. The dish is shown as provided with laterally extending lugs 6 and 7 at opposite sides thereof. These lugs preferably are flush with the bottom of the dish although they need not be, and each lug preferably is provided with a depression 8 in the top thereof. Aside from the lugs 6 and 7 the dish may otherwise have any configuration. Furthermore the size and shape of the lugs 6 and 7 may be greatly varied. The lugs 6 and 7 are flattened to lie entirely outside the rim of the food dish 5. They are well below the rim too so that the securing means used may overlie these oppositely disposed lugs and not project high enough to interfere with the use of the dish except to keep the child from lifting the dish.

The means for securing the dish to a supporting base such as a table top or high chair tray, comprises a pair of clamps 9 and 10. As illustrated, each clamp has an upwardly curved part 11 which rests in the depression 8 of one of the lugs 6 and 7. Preferably the clamps bend downwardly slightly on both sides of the part 11 as indicated at 12 and 13. Each clamp has a looped base portion 14 which curves upwardly from the part 12 and then outwardly and downwardly so as to fit over various sizes of rims 15 that may be provided on a supporting structure such as a tray 16. Beneath the arm 11 the clamp has an extension which is bent upwardly as indicated at 17, at a distance from the upward bend 17, the extension is provided with another upwardly bent portion 18, leaving an intermediate portion 19 between the points 17 and 18. A tip 20 is provided beyond the portion 18 and is bent downwardly slightly to facilitate placing of the clamp on the support tray.

The clamps 9 and 10 are preferably made of spring metal and covered with rubber or the equivalent as indicated at 21. It is evident that when the clamp is applied as shown in the drawings, the portions 17 and 18 provide spaced bearing points to engage the lower surface of the tray 16. These spaced bearing points are on the opposite sides of the portion 11 which seats in the depression 8 of one of the lugs 6 and 7 of the dish 5. The dish is thus yieldingly held in place on the tray surface and cannot be tipped or moved by the child. The spring clamps 9 and 10 are simple in construction and are easily kept clean and sanitary. The dish 5 can be used with or without the clamps and stores readily. It can also be nested or stacked with similar dishes for shipping purposes.

Having thus described my invention, I claim:

In combination, a dish having two oppositely disposed outwardly extending lugs joining the dish rim substantially at the lower edge thereof, and two separate spring clamps, one for each lug, each clamp having an upper lug engaging portion bent to extend downwardly on both sides of the lug over which it extends, each clamp having a base loop to accommodate a raised edge of a high chair tray, each clamp also having a lower extension spaced below and aligned with the upper portion of the clamp to engage the lower side of the tray, each of said lugs having a depression in the top thereof adjacent to the rim in which the upper portion of the corresponding clamp seats, the lower extension of each clamp having two spaced apart upwardly bent portions, one being closer to the base loop than the lug engaging part of the upper portion and the other being farther from the base loop than said lug engaging part, for engaging the lower surface of the tray.

References Cited in the file of this patent

UNITED STATES PATENTS

| | | |
|---|---|---|
| D. 20,412 | Van der Elst | Dec. 16, 1890 |
| D. 58,200 | Sailer | June 21, 1921 |
| 475,745 | Anderson | May 31, 1892 |
| 491,702 | Felix | Feb. 14, 1893 |
| 560,116 | Watrous | May 12, 1896 |
| 795,315 | Stanley | July 25, 1905 |
| 831,197 | Teute | Sept. 18, 1906 |
| 938,082 | Siegel | Oct. 26, 1909 |
| 1,159,673 | Holybee | Nov. 9, 1915 |
| 1,222,390 | Gorham et al. | Apr. 10, 1917 |
| 1,242,785 | Eldridge | Oct. 9, 1917 |
| 1,621,720 | Harper | Mar. 22, 1927 |
| 1,756,963 | Ware | May 6, 1930 |
| 1,893,628 | Marsden | Jan. 10, 1933 |
| 2,398,060 | Van Alstyne | Apr. 9, 1946 |

FOREIGN PATENTS

| | | |
|---|---|---|
| 388,383 | France | May 29, 1908 |
| 72,609 | Switzerland | June 2, 1916 |